United States Patent [19]

Hiramatsu et al.

[11] Patent Number: 4,692,651
[45] Date of Patent: Sep. 8, 1987

[54] VIBRATION WAVE MOTOR

[75] Inventors: Akira Hiramatsu; Hitoshi Mukohjima; Naoya Kaneda; Takuo Okuno, all of Yokohama; Hiroyuki Seki, Sagamihara; Takayuki Tsukimoto, Fujisawa; Kazuhiro Izukawa; Ichiro Okumura, both of Yokohama, all of Japan

[73] Assignee: Canon Kabushiki Kaisha, Tokyo, Japan

[21] Appl. No.: 844,330

[22] Filed: Mar. 26, 1986

[30] Foreign Application Priority Data

Mar. 29, 1985 [JP] Japan .................................. 60-65456

[51] Int. Cl.⁴ ........................................... H01L 41/08
[52] U.S. Cl. ..................................... 310/323; 310/328
[58] Field of Search .............................. 310/323, 328

[56] References Cited

U.S. PATENT DOCUMENTS 4,495,432 1/1985 Katsuma et al. ..................... 310/328
4,562,374 12/1985 Sashida ......................... 310/323 X Primary Examiner—Mark O. Budd
Attorney, Agent, or Firm—Fitzpatrick, Cella, Harper & Scinto

[57] ABSTRACT

A vibration wave motor has a movable member divided into a plurality of sections in a direction of movement. Opposite ends of press-contact areas of the divided sections of the movable member to a vibration member are supported by a support member. The press-contact areas have a smaller rigidity than that of the support member.

6 Claims, 6 Drawing Figures

Fig. 4
Fig. 5
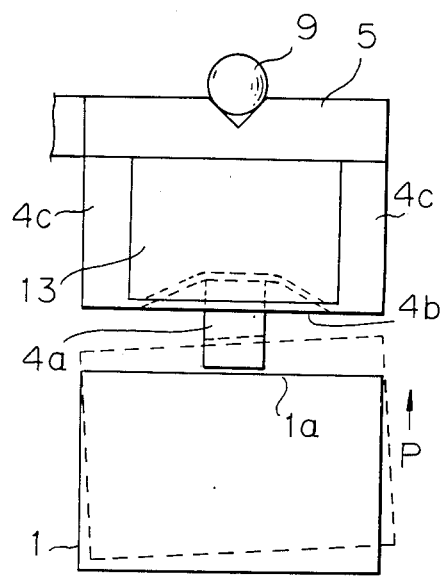
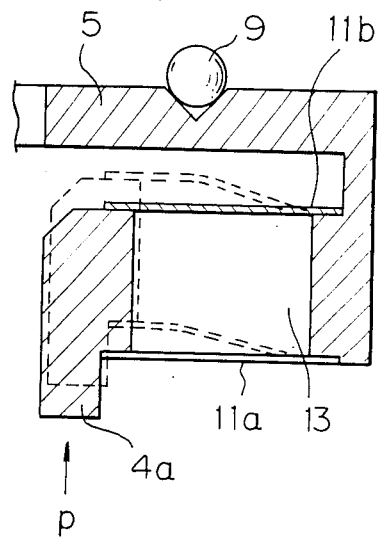
Fig. 6
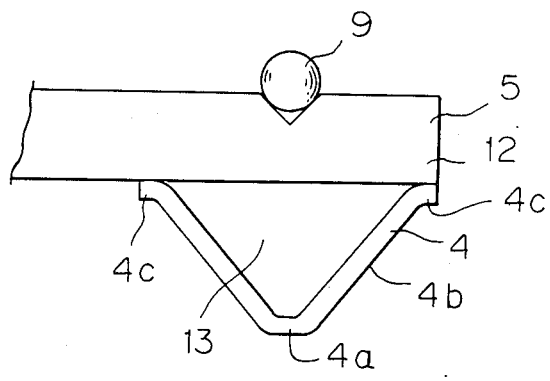

VIBRATION WAVE MOTOR

BACKGROUND OF THE INVENTION

1. Field of the Invention

The present invention relates to a vibration wave motor which excites a vibration member by using an electromechanical transducing element to drive a movable member coupled to the vibration member.

2. Description of the Prior Art

Many proposals have been made on the vibration wave motor. A principle of the vibration wave motor is shown in FIG. 1. Numeral 1 denotes an elastic member which is a vibration member and excited by a piezo-electric device or electrostrictive device (not shown) to generate a travelling wave on a surface of the elastic member 1 as shown. Considering a mass point a on the surface of the elastic member, it vibrates longitudinally and laterally and makes an eliptical motion as shown. Numeral 2 denotes a rotor which is press-contacted to the elastic member 1 at a pressure P and driven in a direction of an arrow A by a lateral motion component of the eliptical motion of the mass point.

An amplitude of the eliptics which is a locus of motion of the mass point is very small such as several microns to several tenths microns. Thus, it is necessary to precisely finish the contact areas of the elastic member 1 and the rotor 2.

The contact area is slightly deformed by the pressure applied to contact the rotor 2 to the elastic member 1. Thus, it is difficult to attain uniform contact over the entire contact area. As a result, motor efficiency is lowered and noise is generated.

In order to resolve the above problems, Japanese Unexamined Patent Publication No. 178987/1984 discloses an approach in which the rotor is divided into a plurality of sections which are independently contacted to the contact areas. The disclosed technique is incomplete because when the vibration generated in the vibration member includes a torsional component, the rotor is obliquely contacted to the elastic member by the torsional component. Therefore, uniform contact of the elastic member and the rotor over the entire contact area is not attained.

Japanese Unexamined Patent Publication No. 188381/1984 discloses a vibration wave motor which comprises a slider constructed by dividing a rotor and a rubber elastic member for supporting the slider. In the disclosed technique, since the slider is supported by the rubber elastic member, the slider may be inclined in any direction. Thus, when the slider is driven by the lateral motion component of the eliptical motion of the mass point of the elastic member, the motion component is absorbed by the rubber elastic member as the slider is inclined so that torque is not effectively transmitted.

SUMMARY OF THE INVENTION

It is an object of the present invention to provide a vibration wave motor which enables uniform press-contact of a plurality of contact areas of a rotor to an elastic member and constant press-contact between the elastic member and the rotor for any change of the contact force so that the efficiency of the motor is improved and a noise is reduced.

It is another object of the present invention to provide a vibration wave motor which resolves the problems encountered in the prior art motor and is easy to construct.

It is another object of the present invention to provide a vibration wave motor which can reduce vibration at an undesired frequency.

It is another object of the present invention to provide a vibration wave motor having a small warp slider.

DESCRIPTION OF THE PREFERRED EMBODIMENTS

Figure 1:
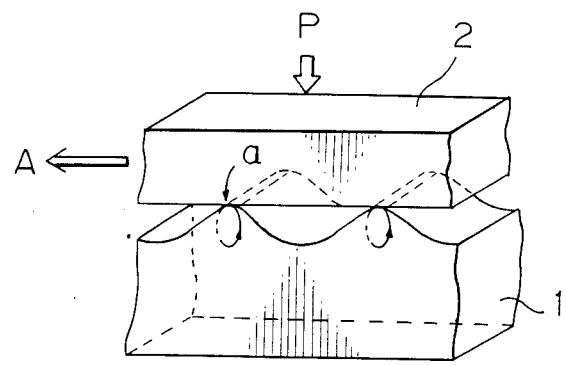
FIG. 1 illustrates a principle of a vibration wave motor.
Figure 3:
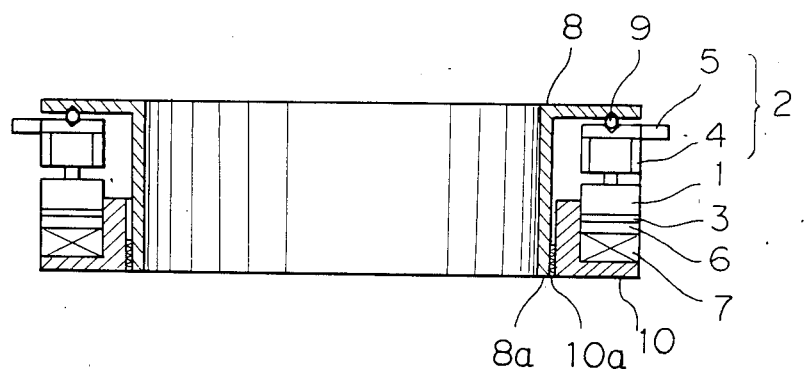
FIG. 3 shows a sectional view of the vibration wave motor shown in FIG. 2, and FIGS. 4 to 6 show enlarged views of sections of rotors in the embodiments of the present invention.
Figure 2:
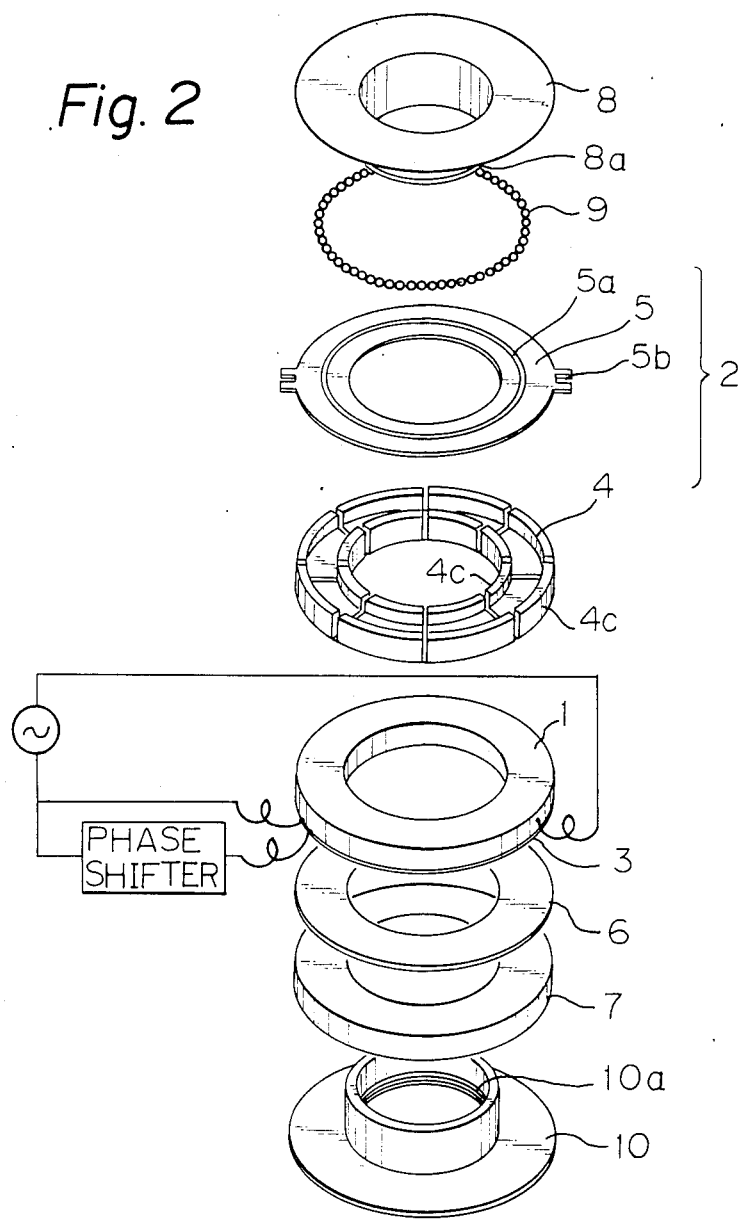
FIG. 2 is a developed perspective view of one embodiment of a vibration wave motor of the present invention.

FIG. 2 shows a developed perspective view of a vibration wave motor of the present invention, and FIG. 3 is a sectional view of the vibration wave motor shown in FIG. 2. Numeral 1 denotes an elastic member to which a piezo-electric or electrostrictive device 3 is bonded. When two periodic voltages having a phase difference (e.g. 90°) therebetween are applied to the piezo-electric or electrostrictive device 3, the elastic member 1 is excited to generate a travelling wave as shown in FIG. 1. Numeral 4 denotes a slider which is press-contacted to the elastic member 1. It is divided into a plurality of (eight in FIG. 2) sections. The slider 4 is bonded to a hold plate 5 to form a rotor 2. Numeral 5a denotes a groove in the hold plate and numeral 5b denotes an output area of the motor. Numeral 6 denotes a vibration absorbing member made of rubber or felt to hold the piezo-electric or electrostrictive device, numeral 7 denotes a pressurizing mechanism for generating contact pressure for the elastic member 1 and the rotor 2, and numerals 8 and 10 denote holding cylinders for holding the elastic member 1 and the rotor 2 therebetween. The contact pressure between the elastic member 1 and the rotor 2 is adjusted by a thread 8a on the upper holding cylinder 8 and a thread 10a of the lower holding cylinder 10. The rotor 2 is rotatably held by the groove 5a of the hold plate 5 and a bearing 9.

FIG. 4 shows an enlarged sectional view of the rotor 2. Numeral 4a denotes a contact area which is press-contacted to the elastic member 1, and numeral 4b denotes a hold area to hold the contact area 4a. The areas 4a and 4b form a contact surface to the elastic member 1. Numeral 4c denotes support areas which support opposite ends of the hold area 4b.

The hold area 4b has a sufficiently lower rigidity than those of the support area 4c and the contact area 4a. When the rotor 2 is pressed at the pressure P by the pressurizing mechanism 7, it is press-contacted to the elastic member 1 at the contact area 4a.

The contact area 4a is pressed by a counterpressure p by the elastic member 1, but since the rigidity of the hold area 4b is sufficiently lower than that of the support area 4c and the contact area 4a, the hold area 4b is deformed as shown by a broken line by the counterpressure p.

Since the slider 4 is constructed by the plurality of sets of contact areas 4a, hold areas 4b and support areas 4c. The contacts areas 4a of the slider 4 are uniformly contacted to the contact surface 1a of the elastic member 1, and even if the vibration generated in the elastic member 1 includes a torsional component, the hold areas 4b deform accordingly so that the hold areas 4b are always uniformly contacted.

FIG. 5 and 6 show other embodiments of the present invention. In FIG. 5, the contact area 4a is supported by a pair of leaf springs 11a and 11b, which are deformed by a counterpressure p as shown by broken lines.

In FIG. 6, the slider 4 is constructed by a thin plate. Since it may be manufactured by pressing, cost can be reduced compared to the embodiments shown in FIGS. 4 and 5 and precision is improved. The slider 4 is mounted and fixed to the support plate 5. The present embodiment presents the some advantage as that of the embodiment of FIG. 4.

By filling spaces of the rotor in the embodiments of FIGS. 4–6 with vibration absorbing material such as silicone rubber, the rubber acts as a damper to reduce vibration at an undesired frequency. The rotor and the slider may be bonded by silicon filler.

By filling the spaces of the rotor as well as the spaces between the divided sliders 4 shown in FIGS. 4 to 6, with vibration absorbing material, warpage of the divided sliders can be reduced.

The hold area 4b in embodiment of FIG. 4, the leaf springs 11a and 11b shown in FIG. 5 and the thin plate slider 4 shown in FIG. 6 may be made of plastic to reduce the rigidity or they may be made of spring materials or other resilient materials.

In the above embodiments, rotary motors have been shown and described. The present invention can also be applied to a linear vibration wave motor in which the movable member is linearly moved.

As described hereinabove, in accordance with the present invention, the slider of the movable member is divided into the plurality of sections and the contact areas of the slider are resiliently held such that they have a low rigidity normal to the contact area and a high rigidity parallel with to the contact area. Thus, the slider sections of the movable member are uniformly contacted to the elastic member and the partial contact in which the movable member is only partially contacted to the elastic member can be prevented.

What is claimed is:

1. A vibration wave motor comprising:
   (a) vibration means having electro-mechanical conversion elements for generating a travelling vibration wave when electrical signals having a phase difference therebetween are applied to said elements; and
   (b) movable means adopted to be frictionally driven by the travelling vibration wave generated in said vibration means, a press-contact portion of said movable means which is in contact with said vibration means being divided into a plurality of sections along a direction of movement of said movable means and the rigidity of the surface of said divided press-contact portion, which is parallel with a forward moving direction of the travelling vibration wave, being lower than that of the surface of said divided press-contact portion, which is perpendicular to the forward moving direction of the travelling vibration wave.

2. A vibration wave motor according to claim 1, wherein said movable means has ring shape.

3. A vibration wave motor according to claim 1, wherein said press-contact portion is formed to be U-shaped.

4. A vibration wave motor comprising:
   (a) vibration means having electro-mechanical conversion elements for generating a travelling vibration wave when electrical signals having a phase difference therebetween are applied to said elements; and
   (b) movable means adopted to be frictionally driven by the travelling vibration wave generated in said vibration means, said movable means having a press-contact portion, which is in contact with said vibration means, being divided into a plurality of sections along a direction of movement of said movable means, wherein each of said plural sections has a torque transmission member which is in contact with said vibration member, and a supporting member for supporting said torque member, and the rigidity of said supporting member being lower than that of said torque transmission member.

5. A vibration wave motor according to claim 4, wherein said supporting member is adopted to support said torque transmitting member so that said torque transmitting member is maintained in parallel with said vibration means.

6. A vibration wave motor according to claim 5, further comprising a vibration absorbing member filling the U-shaped space of said press-contact portion.

* * * * *

UNITED STATES PATENT AND TRADEMARK OFFICE
CERTIFICATE OF CORRECTION

PATENT NO. : 4,692,651

DATED : September 8, 1987

INVENTOR(S) : Akira Hiramatsu, et al.

It is certified that error appears in the above-identified patent and that said Letters Patent is hereby corrected as shown below:

COLUMN 1

Line 20, "eliptical" should read --elliptical--.
    Line 24, "eliptical" should read --elliptical--.
    Line 25, "eliptics" should read --elliptics--.
    Line 39, "incom-" should read
             --not entirely satisfactory--.
    Line 40, delete "plete".
    Line 53, "eliptical" should read --elliptical--.
    Line 66, delete "a".

COLUMN 2

Line 45, "of" should read --on--.
    Line 56, "those" should read --that--.
    Line 68, "4c. The contacts" should read
             --4c, the contact--.

COLUMN 3

Line 6, "FIG. 5" should read --FIGS. 5--.
    Line 15, "some" should read --same--.
    Line 40, delete "to".

Signed and Sealed this

Ninth Day of February, 1988

Attest:

DONALD J. QUIGG

Attesting Officer

Commissioner of Patents and Trademarks